United States Patent
Batterton

(10) Patent No.: US 6,516,752 B2
(45) Date of Patent: Feb. 11, 2003

(54) VETERINARY BATHING STATION WITH ROTATING INGRESS/EGRESS RAMP

(76) Inventor: Richard Batterton, 554 S. Allen St., Boyd, TX (US) 76023

( * ) Notice: Subject to any disclaimer, the term of this patent is extended or adjusted under 35 U.S.C. 154(b) by 0 days.

(21) Appl. No.: 09/899,363

(22) Filed: Jul. 2, 2001

(65) Prior Publication Data

US 2003/0000482 A1 Jan. 2, 2003

(51) Int. Cl.[7] .............................................. A01K 13/00
(52) U.S. Cl. ........................ 119/650; 119/674; 119/847
(58) Field of Search .............................. 119/600, 650, 119/665, 673, 674, 678, 847, 848, 485, 706; 403/164–166; 4/538, 560.1, 562.1

(56) References Cited

U.S. PATENT DOCUMENTS

| | | | |
|---|---|---|---|
| 494,265 A | 3/1893 | Sieker et al. | |
| 606,946 A | 7/1898 | Steen | |
| 663,417 A | 12/1900 | Clayton | |
| 3,485,213 A | 12/1969 | Scanlon ........................ 119/29 |
| 3,807,363 A | * 4/1974 | Lehman ....................... 119/158 |
| 4,332,217 A | 6/1982 | Davis ........................... 119/29 |
| 5,193,487 A | * 3/1993 | Vogel ........................ 119/158 |
| 5,213,064 A | * 5/1993 | Mondine et al. ............. 119/158 |
| 5,329,878 A | * 7/1994 | McCauley .................... 119/165 |
| 5,494,001 A | * 2/1996 | Leibowitz .................... 119/163 |
| 5,662,069 A | * 9/1997 | Smith .......................... 119/665 |
| 5,794,570 A | 8/1998 | Foster et al. ................. 119/756 |
| 6,119,634 A | 9/2000 | Myrick ........................ 119/847 |
| 6,237,537 B1 | * 5/2001 | Winchester ................. 119/673 |

* cited by examiner

Primary Examiner—Charles T. Jordan
Assistant Examiner—Kimberly S. Smith
(74) Attorney, Agent, or Firm—Bracewell & Patterson LLP

(57) ABSTRACT

A veterinary bathing station for washing animals is shown which includes a stall having a bottom wall and enclosing sidewalls. One of the sidewalls has a door opening for ingress and egress of an animal to be bathed or groomed. A ramp is connected to the stall bottom wall by a rotatable coupling and can be rotated between a retracted and extended positions which allow the ramp to easily rotate in and out of the open space created under the bottom wall of the washing stall to thereby allow the animal ingress and egress through the wall opening.

8 Claims, 1 Drawing Sheet

VETERINARY BATHING STATION WITH ROTATING INGRESS/EGRESS RAMP

BACKGROUND OF THE INVENTION

1. Technical Field

The present invention relates generally to a veterinary bathing station and, particularly, to such a station having an improved means for the ingress and egress of an animal to be bathed or groomed.

2. Description of the Related Art

In veterinary medicine, the traditional areas of practice are divided into large animal practice dealing with, e.g., cows and horses, and small animal practice dealing with, e.g., dogs and cats. In the discussion which follows, the expression "small animal" will be understood to mean, for example, a dog which is to be bathed or groomed, even if the dog in question weighs upward of 50 pounds and is of considerable size. Often, in while in the care of a veterinarian, such small animals must be washed, brushed, clipped and otherwise groomed for health and hygiene reasons. Veterinarian and professional groomers generally have specialized bathing stations for use in washing and grooming small animals. The bathing stations are often raised above the surrounding support surface, i.e., the floor of the building, to approximately waist height to make it easier to wash and groom the animal. Typically, the bathing stations have high sides to prevent splashing and to keep the animal from escaping. When washing a large dog, it is difficult to lift the dog into the washing station. Back strains or other injuries can occur if the animal is heavier than expected or if the animal begins to squirm or to resist being lifted.

Thus, there is a need for an improved veterinary bathing station that is more convenient and comfortable to use with small animals such as larger dogs.

BRIEF SUMMARY OF THE INVENTION

It is an object of the present invention to provide a veterinary bathing station that is more convenient and comfortable to use and yet which is relatively economical to manufacture.

It is another object of the present invention to provide a veterinary bathing station which provided improved ingress and egress for a small animal such as a larger dog.

It is yet another object of the present invention to provide a veterinary bathing station that will reduce the risk of injury to the user.

The above objects are achieved by providing a veterinary bathing station including a washing stall having a bottom wall and surrounding side walls, at least one of the surrounding side walls having an opening of sufficient size to allow an animal to pass through. A plurality of leg elements are provided for elevating the bottom wall of the washing stall above a surrounding support surface a selected distance, wherein an open space is created between the bottom wall and the surrounding support surface. The stall also includes a ramp having an inclined ramp surface defined between a top end and a bottom end of the ramp for allowing ingress and egress of an animal from the surrounding support surface through the wall opening without the necessity of lifting the animal. A rotatable coupling attaches the top end of the ramp to the bottom wall of the washing stall, whereby the ramp is rotatable about a vertical axis between a retracted position and an extended position into and out of the open space created under the bottom wall of the stall. The extended position serves to align the ramp with the wall opening to thereby allow the animal ingress and egress through the wall opening.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

DETAILED DESCRIPTION OF THE PREFERRED EMBODIMENT

Figure 1:
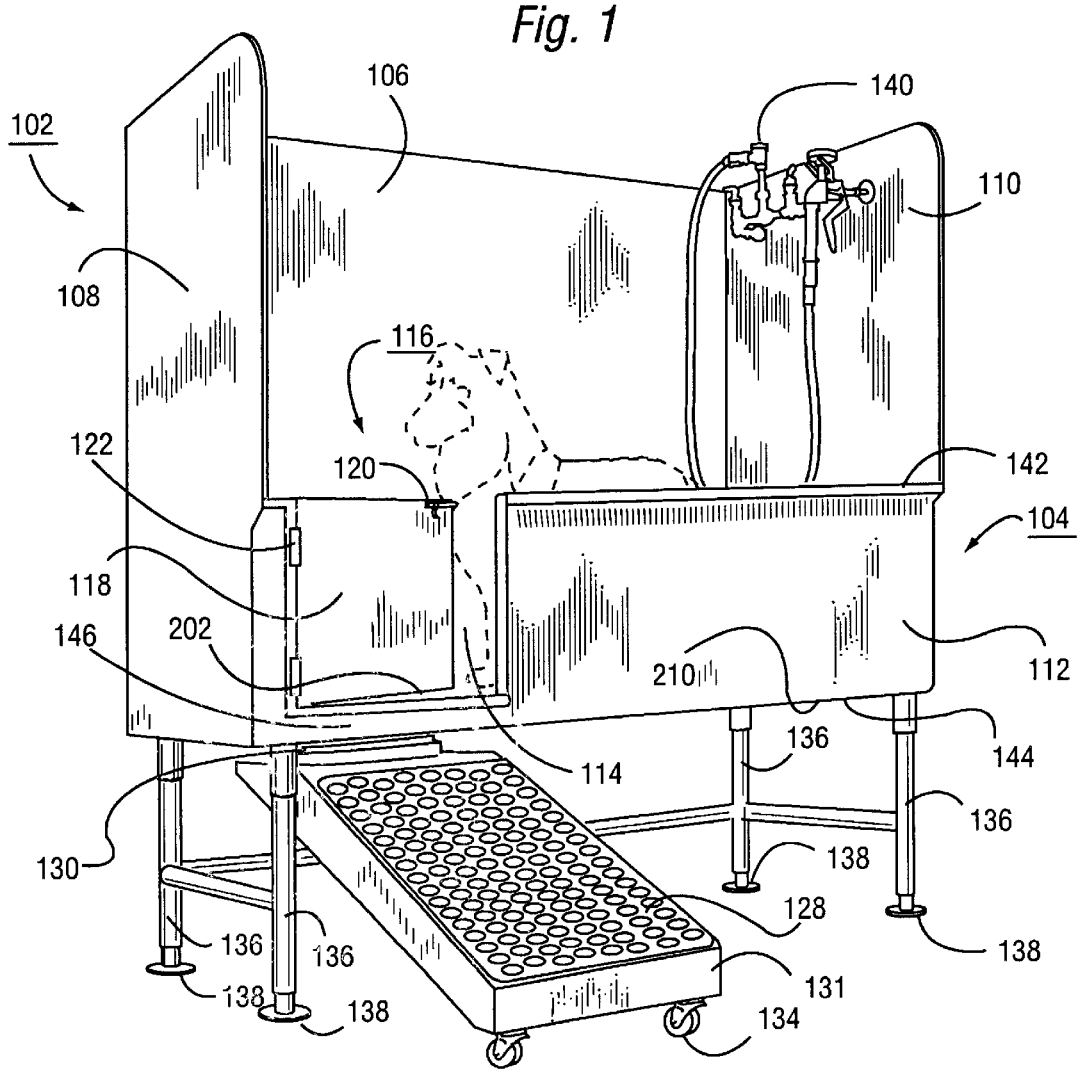
FIG. 1 is a perspective view of the veterinary bathing station of the present invention showing an animal to be groomed in phantom lines within the stall enclosure of the station.

With reference to FIG. 1, a veterinary bathing station 102 for washing a small animal such as a large dog is shown. The bathing station 102 comprises a washing stall 104 having an initially open interior 116 defined by a side walls 106, 108 and 110 and front washing wall 112. A bottom wall 202 having a top planar surface 208 and a bottom planar surface 210 complete the enclosure. The entire bathing station 102 can be made of any conveniently available water resistant material that is structurally sound but is preferably made of stainless steel. A particularly preferred material is 16 gauge type 304 stainless steel. While the bathing station 102 has been shown as a generally rectangular enclosure, it will be understood that other wall configurations might be utilized as well, such as, for example, an oval configuration.

In the case of the bathing station illustrated in FIG. 1, the stall bottom wall or floor 202 measures approximately 4–6 feet in length by 1–3 feet in width such that there is sufficient room to turn a large dog around to reach the dog's hind quarter. Walls 108 and 110 are approximately 1–3 feet in width and match the width of the bottom wall 202. The side wall 106 and washing wall 112 are approximately 4–6 feet in length and also match the dimensions of the stall floor 202. The washing wall 112 is approximately 3–5 feet in height in order to contain splashes and splatters and to help prevent against water damage to the surrounding areas but is low enough to allow the user to easily reach the stall interior in order to place an animal within the enclosure. The overall dimensions of the bathing station 102 may be roughly 60"W×66"H×29"D.

The edges and corners of the washing stall 104 and in particular the exposed portions of the washing wall 112 are rounded and may be covered with a cushioning type of material such as a rubber sleeve or coating to help prevent an animal or user from coming into contact with the corner regions. The walls and floor of the washing stall may be welded, forged, or otherwise formed into the enclosed shape illustrated in FIG. 1.

The front portion of the stall interior contains a bathing faucet 140 of conventional design. The bathing faucet 140 preferably has a swing nozzle or utility spray that allows the user to reach the full span of the stall. The utility spray may have a flexible stainless steel hose, typically about 72 inches in length. The front portion may also include a wall hook for hanging the hose when not in use.

Figure 2:
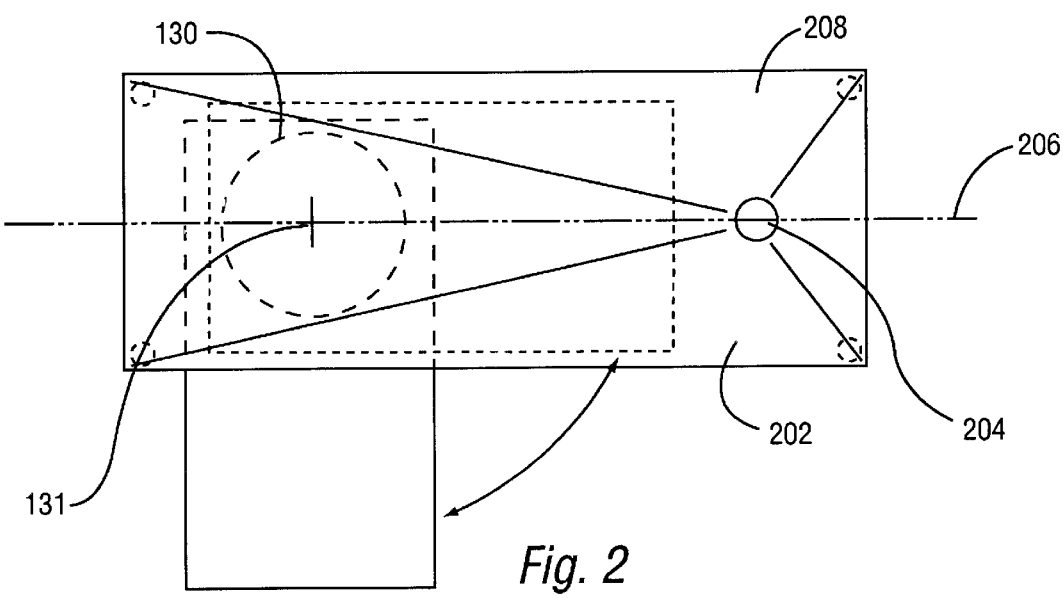
FIG. 2 is a simplified top view of the veterinary bathing station of FIG. 1 showing the extended and retracted positions of the rotatable ramp.

The stall floor 202 has a drain port 204 (FIG. 2). The drain port 204 in the illustrated embodiment is located in the front interior region of the stall floor and is centered along a central axis 206 of the floor 202. The floor 202 preferably slopes to the drain port 204, the slope being in the range from about 0° to about 5° such that water or other material will flow towards the drain but not such a slope that a wet animal would have difficulty standing on the slick, wet surface and be unable to gain a secure footing. A "star" break centered around the drain port 204 may help prevent water from collecting in the corners of the stall 104.

As seen in FIG. 1, the stall is supported by leg elements support members 136. The leg elements 136 are preferably provided with adjustable feet 138 to compensate for uneven flooring or to adjust the height of the stall 202 to approximately 2–4 feet from the ground. The support members 136 themselves may also be adjustable. In addition, the feet 138 may include mounting plates to secure the bathing station 102 to the surrounding support surface of flooring.

The washing wall 112 has an opening 114 of sufficient size to allow an animal ingress and egress to the stall interior. The opening 114 illustrated in FIG. 1 is approximately 2 feet wide and extends from the top edge 142 of the washing wall 110 to about 0.5–3 inches from the bottom 144 of the washing wall 110. Thus, the opening does not extend down the entire height of the washing wall 112 to the floor 202, but rather produces a lip 146. The lip 146 helps prevent water from being splashed outside the stall 104 when the animal exits and generally obviates the need to seal the bottom of the opening 114. The opening 114 may have a hinged or sliding door 118 that can be secured by latch 120, a hook, or some other means such as a magnet that can secure the door 118 in an open or closed position. The door 118 may be designed such that a lip seal is formed when the door 118 is shut or it may have a rubber lining that allows for the door 118 to be reasonably sealed with the washing wall 112 when in the closed position. The door 118 illustrated in FIG. 1 is mounted on hinges 122 which allow the door to swing open towards the interior of the stall. When closed, the door should be flush with the wall so a relatively smooth side is produced on both the inner portion 116 and outer portion of the washing basin 104.

A rotatable coupling or swivel 130 is located on the bottom planar surface of the floor 210 of the stall. The coupling is located on the centerline 206 shown in FIG. 2. The rotatable coupling 130 is capable of rotating at least 90° about a vertical axis 131 located on the centerline 206. The rotatable coupling supports a ramp 128. The ramp 128 is generally between about ½ and 2 feet wide and has an inclined ramp surface defined between a top end (adjacent the rotatable coupling 130) and a bottom end 131. The ramp surface allows ingress and egress of an animal from the surrounding support surface through the wall opening without the necessity of lifting the animal. The rotatable coupling thus attaches the top end of the ramp to the bottom wall 202 of the washing stall, whereby the ramp is rotatable about the vertical axis 131 into and out of the open space created under the bottom wall of the stall between a retracted position and an extended position. The extended position illustrated in solid lines in FIGS. 1 and 2 serves to align the ramp with the wall opening to thereby allow the animal ingress and egress through the wall opening.

Preferably, the ramp bottom end 131 is solely supported by ball bearing swivel casters 134 which allow the bottom end 131 of the ramp 128 to slide, glide, or roll across the floor. The slope of the ramp 128 is steep enough so that it can slide under the washing basin 104 when not in use and still provide a means for easy access to the opening 114 but does not an unreasonable large pitch making walking up the ramp difficult. The ball bearings casters 134 allow the ramp 128 to move with very little applied force. The ramp may also be provided with a lock or soft stop which holds the ramp 128 in the extended position so there is very little movement when the animal is using the ramp 128. The ramp 128 may be covered with a rubber matt or some other non-slip type surface.

An invention has been provided with several advantages. The bathing station of the invention provides a water tight enclosure with ease of access for a small animal, including large dogs which would otherwise be difficult to lift and maneuver. The animal can be easily led up the ramp 128, through the opening 114 and into the stall 104. Once the animal is in the stall 104, the door 118 may be closed and latched so a reasonably water tight seal is created around the stall enclosure. The ramp 128 is moved by the user to a position underneath the stall 104. Because the ramp 128 is connected to the stall by a rotatable connection, the user can simply pushing the ramp in the direction underneath the washing basin 104 by using the foot or leg. Once the animal is bathed, the ramp is moved from underneath the washing basin 104 to a position that will allow the animal to walk down the ramp. The ramp can then again be moved to the retracted position underneath the bottom wall of the stall. Because the animal does not have to be lifted over the side walls to an elevated position, the user is spared the likelihood of potential injuries.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A veterinary bathing station for washing small animals, the bathing station comprising:

a washing stall having a bottom wall and surrounding side walls, at least one of the surrounding side walls having an opening of sufficient size to allow an animal to pass through;

a plurality of leg elements for elevating the bottom wall of the washing stall above a surrounding support surface a selected distance, thereby creating an open space between the bottom wall and the surrounding support surface;

a ramp having an inclined ramp surface defined between a top end and a bottom end of the ramp for allowing ingress and egress of an animal from the surrounding support surface through the wall opening without the necessity of lifting the animal;

a rotatable coupling attaching the top end of the ramp to the bottom wall of the washing stall, whereby the ramp is rotatable about a vertical axis into and out of the open space created under the bottom wall of the stall between a retracted position and an extended position, the extended position serving to align the ramp with the wall opening to thereby allow the animal ingress and egress through the wall opening.

2. The bathing station of claim 1, wherein the ramp bottom end is provided with at least one roller element to facilitate movement of the ramp over the support surface between the retracted and extended positions.

3. The bathing station of claim 1, wherein the bottom wall of the stall is located approximately 2–4 feet above the surrounding support surface.

4. The bathing station of claim 1, wherein the bottom wall is provided with a drain port for draining liquids from the bathing station.

5. The bathing station of claim 1, wherein the stall bottom wall and side walls are made of stainless steel.

6. The bathing station of claim 1, wherein the leg elements include adjustable feet to compensate for uneven flooring and to adjust the height of the stall from the surrounding support surface.

7. The bathing station of claim 1, further comprising a hinged door for opening and closing the wall opening in the stall.

8. A method for washing animals comprising the steps of:

providing a bathing station comprising:

a washing stall having a bottom wall and surrounding side walls, at least one of the surrounding side walls having an opening of sufficient size to allow an animal to pass through;

a plurality of leg elements for elevating the bottom wall of the washing stall above a surrounding support surface a selected distance, thereby creating an open space between the bottom wall and the surrounding support surface;

a ramp having an inclined ramp surface defined between a top end and a bottom end of the ramp for allowing ingress and egress of an animal from the surrounding support surface through the wall opening without the necessity of lifting the animal;

a rotatable coupling attaching the top end of the ramp to the bottom wall of the washing stall, whereby the ramp is rotatable about a vertical axis into and out of the open space created under the bottom wall of the stall between a retracted position and an extended position, the extended position serving to align the ramp with the wall opening to thereby allow the animal ingress and egress through the wall opening;

rotating the ramp from the retracted position to the extended position;

walking the animal up the ramp and through the wall opening into the stall;

rotating the ramp to the retracted position;

bathing or grooming the animal;

rotating the ramp to the extended position to allow the animal egress from the stall.

* * * * *